US007064318B2

(12) United States Patent
Bui

(10) Patent No.: US 7,064,318 B2
(45) Date of Patent: Jun. 20, 2006

(54) METHODS AND APPARATUS FOR ALIGNING ION OPTICS IN A MASS SPECTROMETER

(75) Inventor: Huy A. Bui, Fremont, CA (US)

(73) Assignee: Thermo Finnigan LLC, San Jose, CA (US)

( * ) Notice: Subject to any disclaimer, the term of this patent is extended or adjusted under 35 U.S.C. 154(b) by 112 days.

(21) Appl. No.: 10/649,586

(22) Filed: Aug. 26, 2003

(65) Prior Publication Data

US 2005/0045815 A1 Mar. 3, 2005

(51) Int. Cl.
*B01D 59/44* (2006.01)
*H01J 49/00* (2006.01)

(52) U.S. Cl. ...................... 250/282; 250/281; 250/287; 250/288; 422/50; 422/63; 422/99; 436/43; 436/46

(58) Field of Classification Search ................ 250/281, 250/282
See application file for complete search history.

(56) References Cited

U.S. PATENT DOCUMENTS 5,969,350 A 10/1999 Kerley et al.
6,491,702 B1 * 12/2002 Heilbrun et al. ............ 606/130
6,498,690 B1 12/2002 Ramm et al.
6,673,315 B1 * 1/2004 Sheridan et al. .............. 422/50
6,683,316 B1 * 1/2004 Schamber et al. ....... 250/492.1
6,804,410 B1 * 10/2004 Lennon et al. .............. 382/274
2002/0191864 A1 12/2002 Lennon et al.
2003/0027342 A1 * 2/2003 Sheridan et al. .............. 436/43
2003/0052859 A1 3/2003 Finley
2003/0142862 A1 * 7/2003 Snow et al. ................ 382/154
2005/0045815 A1 * 3/2005 Bui ............................ 250/282

OTHER PUBLICATIONS

Justin W. Torpey et al., "*Validation Of Pattern Recognition Software With Automated Protein Identification Using An Orthogonal MALDI-QqTQF Mass Spectrometer*", Applied BioSystems and MDS Sciex, 52nd Annual ASMS Conference, Jun. 2002.

* cited by examiner

*Primary Examiner*—John R. Lee
*Assistant Examiner*—Bernard E. Souw
(74) *Attorney, Agent, or Firm*—Fish & Richardson P.C.; Charles B. Katz

(57) ABSTRACT

Methods and apparatus, including computer program products, mass spectrometry systems, and sample plates for use in such systems, implement techniques for calibrating an ion source that includes a sample control system including a sample holder and a laser source. A sample plate is mounted in the sample holder, and a relationship is determined between a coordinate system of the sample plate and a coordinate system of the sample control system. The relationship is used to align a target region of the sample plate with ion optics of a mass spectrometer for a mass spectrometric analysis. The relationship is determined at least in part by aligning one or more fiducials relative to a reference point of the sample control system. The fiducials define reference points of the sample plate coordinate system. The techniques can be used to facilitate processes involving partial or full automation.

51 Claims, 5 Drawing Sheets

METHODS AND APPARATUS FOR ALIGNING ION OPTICS IN A MASS SPECTROMETER

TECHNICAL FIELD

This invention relates to the preparation and processing of samples using MALDI mass spectrometry.

BACKGROUND

In recent years, matrix assisted laser desorption ionization (MALDI) mass spectrometry, a technique that provides minimal fragmentation and high sensitivity for the analysis of a wide variety of fragile and non-volatile compounds, has become widely used. MALDI is often combined with time-of-flight (TOF) mass spectrometry, FTICR, quadrupole ion trap, and triple quadrupole mass spectrometers, providing for detection of large molecular masses. This technique can be used to determine molecular weights of biomolecules and their fragment ions, monitor bioreactions, detect post-translational modifications, and perform protein and oligonucleotide sequencing, for tissue imaging, and many more applications.

In its simplest form, the MALDI technique involves depositing the sample (analyte) and a matrix dissolved in a solvent as a spot on a target plate. After the solvent has evaporated, the mixture of sample and matrix is left on the target plate. This is inserted into a mass spectrometer where a pulse from a laser irradiates the matrix and causes it to evaporate. The sample is carried with the matrix, ionized, and analyzed by the mass spectrometer.

Sample preparation methods often involve dilution of small amounts of sample (analyte) in a large molar excess of matrix molecules, typically small organic compounds, in solution. The mixture of matrix and sample is deposited as a spot at a defined target region on a sample plate that may contain as many as 384 or more target regions. As the solvent slowly evaporates, matrix crystals are formed at the target region and may become visible even to the naked eye. The resulting areas of sample deposition can be quite inhomogeneous, with areas of high matrix and sample density and other areas of low or zero density coexisting within a target region. There may also be errors in the positioning of the sample spot at the target region that result in sample spots that are not positioned in the center of the target region.

Once the solvent has evaporated, the sample plate containing the sample spots is inserted into the mass spectrometer and the sample at each target region is analyzed. Typically the diameter of the laser beam where it impacts the target is considerably smaller than the diameter of the sample spot, and data from multiple laser pulses directed at different regions of the sample spot are used to analyze the sample. Sample spot regions can be selected for irradiation with the laser manually, by viewing an image of the sample with a high magnification video system, or automatically by moving the laser or sample plate through a series of predefined positions (such as spiral or zig-zags for example) that cover the target region area that is expected to contain the sample spot.

Manually selecting regions within the sample spot typically requires the full time attention of a skilled operator and is generally not amenable to automation. Automatically moving the laser focal point or the sample plate so that the laser beam focuses on predefined regions within in the sample spot can lead to data sets where the laser pulse has missed the sample completely due to inhomogeneity of the sample spot within the target region. This can result in poor data quality or significantly extended analysis times as the number of laser shots for each target region is increased to ensure that adequate data is acquired.

Some techniques make it possible to resolve inhomogeneous mixtures of matrix and analyte. However these techniques require the precise alignment of the laser of the mass spectrometry apparatus with the samples on the sample plate, such that the laser impinges on the crystals at the points of greatest intensity. This is known hunting for "sweet spots".

All of the methods described above can be tedious, time-consuming and expensive, generally requiring the services of well trained personnel, the out-sourcing of sample preparation or the need to facilitate sample preparation in-house at considerable expense.

SUMMARY

The invention provides improved apparatus and techniques for performing mass spectrometry analysis, in particular MALDI mass spectrometry.

In general, in one aspect, the invention provides methods and apparatus, including computer program products, mass spectrometry systems, and sample plates for use in such systems, implementing techniques for calibrating an ion source that includes a sample control system including a sample holder for supporting a sample plate in a sample plane and a laser source having a focal point representing a point at which a beam generated by the laser source intersects the sample plane. The techniques include mounting a sample plate in the sample holder, determining a relationship between a coordinate system of the sample plate and a coordinate system of the sample control system, and using the determined relationship to align a target region of the sample plate with ion optics of a mass spectrometer for a mass spectrometric analysis. The sample plate includes one or more target regions. The relationship is determined at least in part by aligning one or more fiducials relative to a reference point of the sample control system. The fiducials define reference points of the sample plate coordinate system.

Particular embodiments can include one or more of the following features. One or more of the fiducials can be positioned at a known displacement from a target location of one or more of the target regions. One or more of the fiducials can be formed on a surface of the sample plate, or on a surface of the sample holder. The target location of one or more of the target regions can be a centroid of the corresponding target region. The target location of one or more of the target regions can be formed by a corresponding fiducial. The fiducials can include a first fiducial and a second fiducial disposed at a known displacement from the first fiducial.

Determining the relationship between the coordinate system of the sample plate and the coordinate system of the sample control system can include aligning the reference point with a first fiducial, moving the sample plate relative to the sample control system or the focal point by a distance and in a direction corresponding to the known displacement, and determining an alignment error of the coordinate systems of the sample control system and the sample plate based at least in part on the aligning and the moving. Determining the relationship between the coordinate system of the sample plate and the coordinate system of the sample control system can include generating a first image of the sample plate that includes a representation of a first fiducial, processing the first image to identify a location of the first fiducial, aligning the reference point of the sample control system relative to the identified location of the first fiducial, and determining an alignment error of the coordinate systems of the sample control system and the sample plate based at least in part on the alignment of the reference point relative to the identified location of the first fiducial.

Determining the relationship between the coordinate system of the sample plate and the coordinate system of the sample control system can include processing the first image to identify a location of a second fiducial, aligning the reference point of the sample control system relative to the identified location of the second fiducial, and determining an alignment error of the coordinate systems of the sample control system and the sample plate based at least in part on the alignment of the reference point relative to the identified location of the second fiducial. Determining the relationship between the coordinate system of the sample plate and the coordinate system of the sample control system can include moving the sample plate relative to the reference point, generating a second image of the sample plate that includes a representation of a third fiducial, processing the second image to identify a location of a third fiducial, aligning the reference point of the sample control system relative to the identified location of the third fiducial, and determining an alignment error of the coordinate systems of the sample control system and the sample plate based at least in part on the alignment of the reference point relative to the identified location of the third fiducial. In any of the techniques, some or all of the processing, aligning, or determining an alignment error can performed automatically in a sample control application.

The techniques can include calibrating the focal point of the laser source and the coordinate system of the sample control system. Calibrating the focal point of the laser source and the coordinate system of the sample control system can include aligning the focal point of the laser source and the reference point of the sample control system with the ion optics. Aligning the focal point of the laser source and the reference point of the sample control system with the ion optics can include identifying a point in the sample plane corresponding to a center axis of the ion optics, and aligning the focal point of the laser source and the reference point of the sample control system with the identified point. Aligning the focal point of the laser source and the reference point of the sample control system with the ion optics can include aligning the reference point of the sample control system with a central axis of the ion optics, and aligning the focal point with the reference point of the sample control system.

Determining a relationship can include determining one or more offsets that relate the coordinate system of the sample plate and the coordinate system of the sample control system. Using the determined relationship can include using the offsets to control a movement of the sample plate relative to the focal point or a firing of the laser source, with an accuracy of less than about +/−100 μm. One or more of the fiducials can include two lines arranged in substantially orthogonal configuration.

The invention can be implemented to provide one or more of the following advantages. Precisely registering the sample spot relative to the focal point of the laser facilitates further processing by automation, which limits the need for human involvement in the ionization process. Both the time and the expertise required to analyze multiple samples can be substantially reduced, thereby significantly reducing the cost of the analysis. The type of sample plate can be automatically recognized and sample plate automatically calibrated. The invention can be configured to make artificial intelligence decisions that provide for automation in MALDI instruments, making the instruments more productive, reproductive, reliable and sensitive. The invention is suited for use all mass spectrometers, including, time-of-flight(TOF), FTICR, quadrupole ion trap, triple stage quadrupoles and magnetic sector mass spectrometers.

Unless otherwise defined, all technical and scientific terms used herein have the meaning commonly understood by one of ordinary skill in the art to which this invention belongs. In case of conflict, the present specification, including definitions, will control. Unless otherwise noted, the terms "include", "includes" and "including" are used in an open-ended sense—that is, to indicate that the "included" subject matter is a part or component of a larger aggregate or group, without excluding the presence of other parts or components of the aggregate or group. The disclosed materials, methods, and examples are illustrative only and not intended to be limiting. Skilled artisans will appreciate that methods and materials similar or equivalent to those described herein can be used to practice the invention.

The details of one or more embodiments of the invention are set forth in the accompanying drawings and the description below. Other features, objects, and advantages of the invention will be apparent from the description and drawings, and from the claims.

FIGS. *6a–6d* illustrate various approaches to the calibration of a sample spot array using fiducial marks.

FIG. **7*a*** shows an image of a sample spot as viewed by a CCD camera and displayed on a monitor prior to correction.

FIG. **7*b*** shows an image of a sample spot as viewed by a CCD camera and displayed on a monitor after correction.

Like reference numbers and designations in the various drawings indicate like elements.

DETAILED DESCRIPTION

Figure 1:
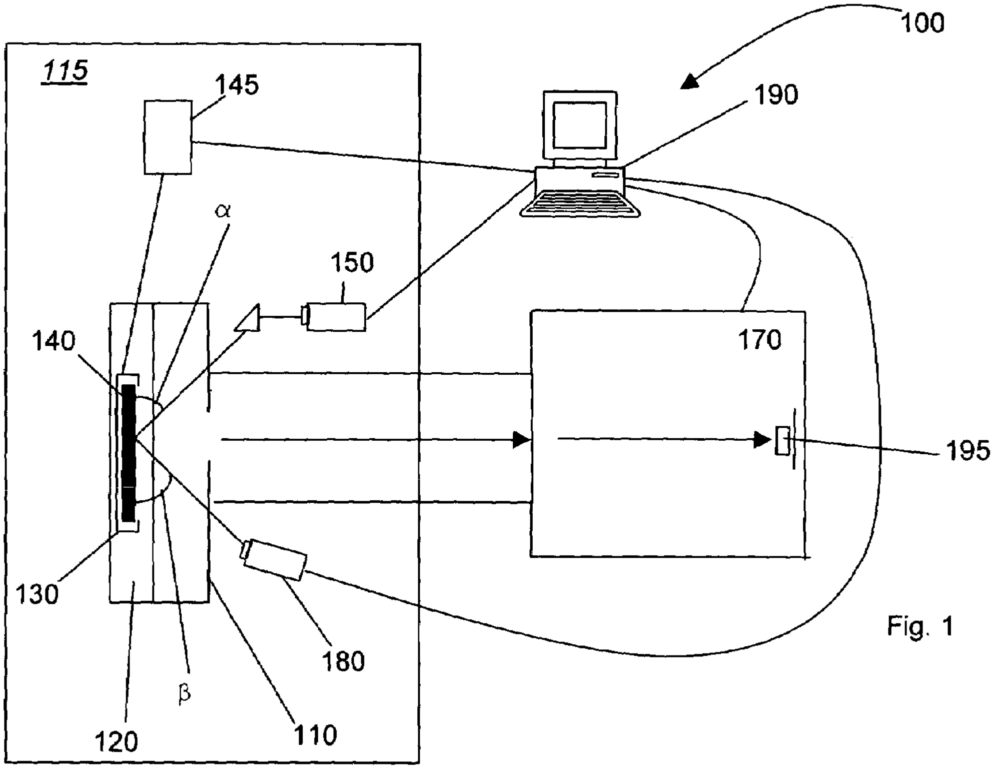
FIG. 1 is a schematic representation illustrating an overall configuration of an analysis system according to one aspect of the invention.

An overall configuration of an analysis system 100 according to one aspect of the present invention is illustrated in FIG. 1. As shown, system 100 includes: an ion source 110, which includes a sample control system 115. Sample control system 115 includes a sample holder 130, located in a vacuum lock chamber 120. Sample holder 130 is configured to receive a sample plate 140 on which a number of samples can be stored. Sample control system 115 also includes a laser source 150 configured to provide a beam 160 that strikes a sample plate 140 in sample holder 130 at a focal point 165; a controller 145 which controls the relative positioning of the sample plate holder 130 and the laser source 150 (in the x-y plane, for example); and an imaging device 180 capable of providing an image of at least a portion of the sample plate 140. Under the control of a processing unit 190, sample control system 115 can be operated to ionize a sample deposited on a sample plate 140 mounted in sample holder 130, and to transmit the ions into a mass spectrometer 170 (incorporating ion optics). The processing unit 190 is configured to control the operation of and process data provided by some or all of the components of the system.

The processing unit can be implemented in a computer system, such as a general purpose computer of conventional construction, a special purpose computer optimized for image processing operations, or a combination of general purpose computer and special purpose hardware. The system can include input/output devices, such as a mouse, a keyboard, a joystick and a video monitor. The processing unit 190 functions to, among other things, control the data flow and perform image processing upon images captured by imaging device 180. The result of the image processing can be a derived image, numerical data (such as the coordinates of salient features of the image) or a combination. The information may be communicated to application specific hardware, which may be a display, for example, or may be written back to the storage media. Some or all of the components of system 100 can be integrated under computer control into a partially or fully automated system. In semi-automated operation, system 100 operates through a user interface which serves as a computer assist. In this mode, the computer can be used to select predetermined points on the sample plate to facilitate registration, to assist in at least one calibration, or to assist the user in selecting the points of the sample that are of highest concentration, for example. In a fully automated system, the system is capable of operating without user intervention once the user has placed the sample plate in the sample plate holder. In this mode, the user plays no part in the registration, calibration, or analysis processes described below.

Figure 2:
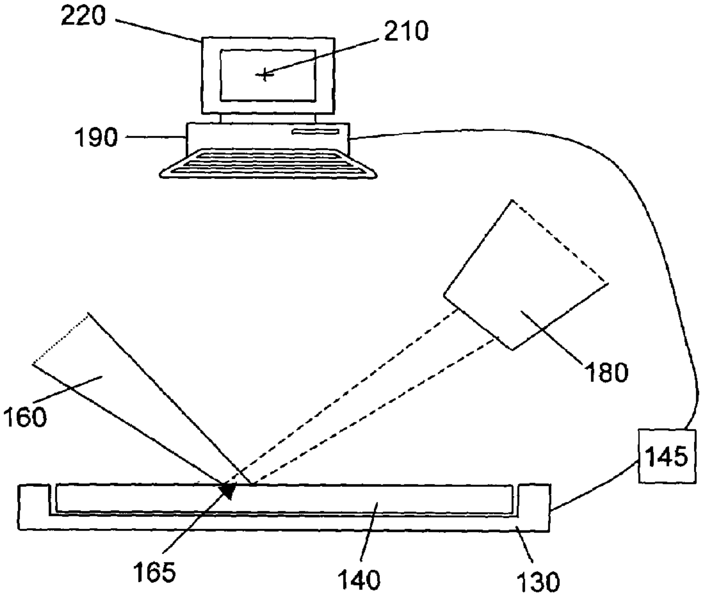
FIG. 2 is a schematic representation illustrating the alignment of an imaging device and the focal point of the optical beam at the surface of a sample plate.

As shown in FIG. 2, focal point 165 represents the location at which beam 160 from source 150 contacts the surface of sample plate 140 upon activation of laser source 150. Focal point 165 is represented in system 100 by a reference point 210 of sample control system 115, which can itself be represented to a user as a cursor on a view finder of imaging device 180 or a display screen 220 displaying an image of sample plate 140.

In operation, a sample plate 140 is mounted in sample holder 130. The sample plate 140 includes a predetermined arrangement of target regions—for example, a number of circular wells or depressions, arranged in the form of a regular grid, in which the analyte and matrix molecules are deposited as discussed above, although different configurations and geometries are possible, as discussed below. The laser source 150 is aimed at the sample plate 140, and the controller 145 moves the sample plate 140 relative to focal point 165, such that the beam 160 will strike a desired location on sample plate 140 (e.g., a sample spot deposited on the plate) at focal point 165. Typically, controller 145 is configured to move the sample plate holder 130 (e.g., using two or more motors), while the laser source remains fixed. Alternatively, controller 145 can be configured to move laser source 150 (and optionally the imaging device 180) such that focal point 165 can be moved to desired locations on the sample plate.

Imaging device 180 is also aimed at sample plate 140, such that a field of view of imaging device 180 encompasses at least a portion of the surface of sample plate 140, which portion includes focal point 165 (which can therefore also represent a focal point of imaging device 180). In order to permit the unobstructed travel of energized sample ions (generated by the irradiation of the sample spot on sample plate 140 by beam 160) from the surface of the sample plate to detector 195, laser source 150 and imaging device 180 are aimed at sample plate 140 at non-orthogonal angles $\alpha$ and $\beta$, respectively. As a result, the cross section of beam 160 as it strikes sample plate 140 at focal point 165 (and the image of the circular sample spot generated by imaging device 180) will be oval, rather than circular, in shape.

Figure 3:
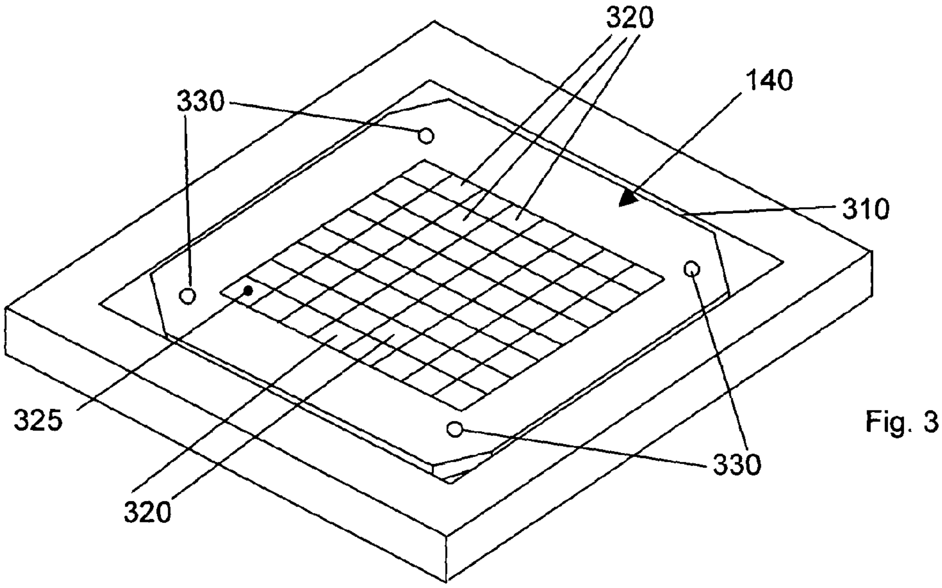
FIG. 3 is a schematic representation of a sample plate with an ideally centralized, symmetrically-placed sample spot array.

FIG. 3 illustrates one type of sample plate 140 suitable for use in embodiments of the invention—a thin, substantially square plate 310 of stainless steel or other suitable material. Sample plates having other geometries and sizes can be used, provided only that the sample plate provides a surface or surfaces on which a sample containing analyte and matrix molecules can be received. In the embodiment of FIG. 3, the plate 310 includes a number of distinguishable target regions 320 in or on which a sample can be deposited. These distinguishable target regions 320 are generally arranged at a known and equal distance from one another, and each has a center point (e.g, centroid) 325. The target regions 320 need not be an exact known, equal or predetermined distance from any one of the edges of the sample plate 140.

Typically, the sample plate 140 is a one-piece plate of metal, glass or plastic supporting a grid or array of receptacles, although other materials and configurations of sample plate are possible, as described below. A typical sample plate 140 contains 96 wells arranged in an area of 8×12 cm, although larger numbers of wells can be used on plates of the same size. Alternatively, the target regions can be provided as a grid of dot blots, which are small dots (reactive sites) that are placed onto a substrate. Typical sample plates 140 can vary in dimension, including the plate size, number, size and spacing of target regions, based, for example, on the particular application or manufacturer.

In general, sample plates are manufactured such that the grid or array of target regions includes a matrix of target regions 320 that are accurately positioned relative to one another. However the angle at which this matrix is imprinted, or the relationship of the matrix to any particular edge of the sample plate 140 is not generally considered. Mere placement of the sample plate 140 into the holder 130 cannot therefore enable the source 150 to be aimed at the center of a particular target region 320 with any real degree of accuracy. Typically, sample plates include a number of alignment apertures 330, to facilitate mounting of the sample plate 140 into its holder 130. In the example shown in FIG. 3, plate 310 includes four apertures 330, one at each corner of the plate 310, but the number of apertures can vary depending, for example, on the shape and size of the sample plate 140, and the configuration of the sample holder 130.

According to one aspect of the invention, system 100 is configured to perform a calibration process prior to sample analysis to provide for precise determination of a relationship between a reference point of sample control system 115 (which can represent one or more of the focal point 165 of laser source 150, or a reference point of controller 145, imaging device 180, or display 220) and positions in a coordinate system of the sample plate 140. In one implementation, the calibration involves aligning the focal point 165 of the laser source 150 (e.g., as represented by cursor 210) with one or more reference marks or fiducials on the sample plate 140 and determining one or more offsets that relate the coordinate system of the sample plate 140 with the coordinate system of sample control system 115 (that is, the coordinate system in which the controller 145, imaging device, laser source 150 and other components of system 100 operate). In a typical implementation, the calibration is performed after the imaging device 180 or the laser source 150 is moved, or a new sample plate 140 is inserted. Generally, the imaging device 180 and source 150 are kept substantially still, so calibration of these devices (to define the reference point 210) may only rarely be required (e.g., once or twice a year). Sample plates are, however, typically moved several times within the day, and several calibrations may be required in one day. Automation of these calibrations can facilitate the turnaround times for sample analysis substantially.

Generally, mere placement of a sample plate 140 into a system 100 without performing such calibration provides for an accuracy of approximately +/−400 μm. That is, by instructing the robotic mechanism 145 to move to a specific (x,y) coordinate position without performing a calibration as described herein, would result in a movement to (x+/−200 μm, y+/−400 μm) This degree of accuracy might be acceptable if the diameter of the focal point of the beam were in excess of this error figure, but with laser beams that are, for example, less than 100 μm in diameter, this is generally an unacceptable accuracy, potentially resulting in shots that miss the hitting the crystal spot completely. By contrast, by performing the calibrations described herein, the accuracy of the correlation between the instructed (x,y) coordinate location and the actual (x,y) coordinate location can be improved to less than 100 μm, typically to less than +/−25 μm, for example, +/−10 μm.

Figure 4:
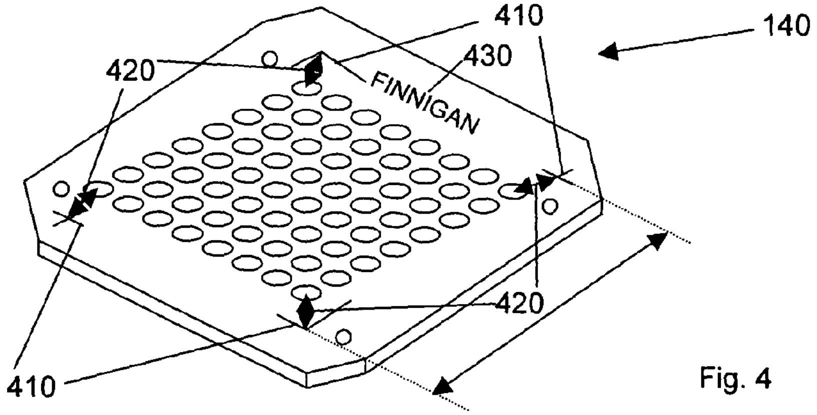
FIG. 4 is a schematic representation of a sample plate according to an aspect of the invention with a non-centralized, asymmetric sample spot array.

To facilitate the calibration process, sample plate 140 can be configured with one or more fiducials 410, as illustrated in FIG. 4. The fiducials are located at nominally known locations relative to one another and are at a known distance 420 from a known target location, such as the centroid 325 or other predetermined reference point, of at least one target region 320 on the sample plate 140. The fiducials are typically formed in or on the surface of sample plate 140, in locations that can be positioned within the field of view of imaging device 180. The fiducials can be formed using any conventional technique, and can be formed as part of the process that forms the target locations 320 or using other processes. As noted, the target location is a reference point associated with one or more target regions, such as the centroid of a target region. The target location can be any point having a predetermined (or, in some embodiments, determinable) relationship with the corresponding target region, and can be within a corresponding target region, outside of the region, or on the perimeter of the region. The target location can, but need not, correspond to a point at which sample material is deposited for analysis.

In the particular example illustrated in FIG. 4, each of the fiducials 410 are formed as a pair of substantially perpendicular lines intersecting at the respective end points of the lines. As another example, the fiducials can be implemented as crosses formed by the intersection of two substantially perpendicular lines. In other embodiments, the fiducials can take any number of forms or shapes. The fiducials are typically, although not necessarily, visually distinguishable from other visual features of the sample plate 140. Indeed, the target region 320 itself may be or include the fiducial—for example, the fiducial can be a predetermined target region (or a portion thereof, such as the perimeter of the target region) that is intentionally left empty of sample for this purpose.

In some embodiments, fiducials can be included on the sample holder 130 instead of, or in addition to, the fiducials described on the sample plate 140, and the calibration and alignment can be performed using these fiducials alone, or in addition to fiducials included on the sample plate. In such embodiments, it may be necessary to perform a preliminary calibration to align the sample plate within the sample holder.

Optionally, the surface of sample plate 140 can incorporate a representation or representations of additional information, including sample data describing the specific sample or samples deposited on the plate, and/or plate data describing the plate itself. The sample data can include, for example, information identifying the analyte and/or matrix compounds in the sample, the quantity, purity, and/or source of the sample compounds, or other sample-specific information, or may provide test specific information regarding dilution ratios, reaction times, the number or format of samples in the array, or the like.

Similarly, the plate data can include, for example, information identifying the plate, such as a plate identifier that can be used to retrieve relevant information, such as sample- or test-specific information from a look-up table. Plate data can also include information identifying the manufacturer of the sample plate, as well as layout information, such as the number, shape, and arrangement of target regions or fiducials on the plate.

The additional information can be incorporated onto the plate in a variety of forms. In one embodiment, sample information and/or plate information are encoded as a bar code or other machine-readable representation. Alternatively, or in addition, some or all of the additional information can be incorporated onto the sample plate in human-readable from. For example, the name of the plate manufacturer can be inscribed on the upper surface of the plate. The imaging device 180 can be programmed or otherwise caused to capture a representation of the inscribed information and pass this representation to processing unit 190. Using conventional pattern recognition software, the processing unit 190 can then, for example, match the representation against information in a look-up-table and use the results of the matching to identify relevant plate information, such as the type and/or layout of the plate.

In one implementation of a calibration process according to an aspect of the invention, the sample plate 140 is subjected to a series of operations that determines the position of the fiducials 410 relative to one another or to a known location, and with respect to the instructed (x,y) coordinates in the coordinate system of the controller 145 (i.e., the reference point of the sample control system). The system uses this information to locate the exact position of a target location (e.g., centroids 325 or other predetermined reference point) of the target regions 320.

The sample plate 140 is manipulated in either or both of the x- and y-directions via drive motors of the controller 145, until a fiducial 410 aligns with the reference point 210 (which represents focal point 165 as discussed above)—that is, until a representation of the reference point 210 and the fiducial 410 are arranged in a predetermined relative position and/or orientation to within a predetermined error. The system receives information from the controller 145 indicating the actual position of the sample plate and uses this information to align the sample plate 140 relative to the reference point 210, thereby determining to a high degree of accuracy the exact location of the target location 325 of every target region 320, since the distance 420 from a fiducial 410 to the target location 325 of at least one target region 320 is known.

In one embodiment, system 100 is configured to calibrate controller 145 with respect to a single fiducial 410, and when reference point 210 has been aligned with respect to one fiducial, the sample plate is considered to be sufficiently aligned so that the focal point 165 can then be substantially aligned with any target location 325 of any target region 320. This assumes that any skew that may be present is negligible.

Alternatively, once alignment has been achieved with respect to one fiducial 410 and the reference point 210, the sample plate 140 is moved a predetermined distance relative to the field of view of imaging device 180, to where a second fiducial is expected to be found. If the second fiducial does not align with the reference point 210, the system concludes that the sample plate 140 is not accurately positioned in the sample holder 130, and repositions the sample plate accordingly. This positioning may be manual or automatic, depending upon whether system 100 is implementing a semi- or a fully-automated procedure.

In any case, the alignment of the first fiducial is preserved in the repositioning process, such that when the second fiducial is aligned with the reference point 210, retracing the previous movement by the predetermined distance results in the alignment of the first fiducial with the reference point 210. The reference point 210 can be similarly aligned with one or more additional fiducials, providing additional confirmation that the system has been calibrated. The coordinates of three fiducials 410 are generally adequate to work out the translation and rotation in two orthogonal directions so long as the fiducials 410 are not collinear. In some embodiments, the coordinates of one or more additional fiducials (e.g., four or more fiducials 410) are used, which also serves as a consistency check.

Because the fiducials can be incorporated at known locations on the sample plate (or sample holder), it is generally not necessary to subject the entire sample plate 140 to these processing steps. Instead, system 100 can be configured to process only the portions of the sample plate (or sample holder) surface in which the fiducials are expected to be located. In the example illustrated in FIG. 4, the fiducials 410 are located near the corners of the sample plate 140, and the system 100 can therefore be configured to process only the rectangular areas located in the corner regions of the sample plate.

Figure 5:
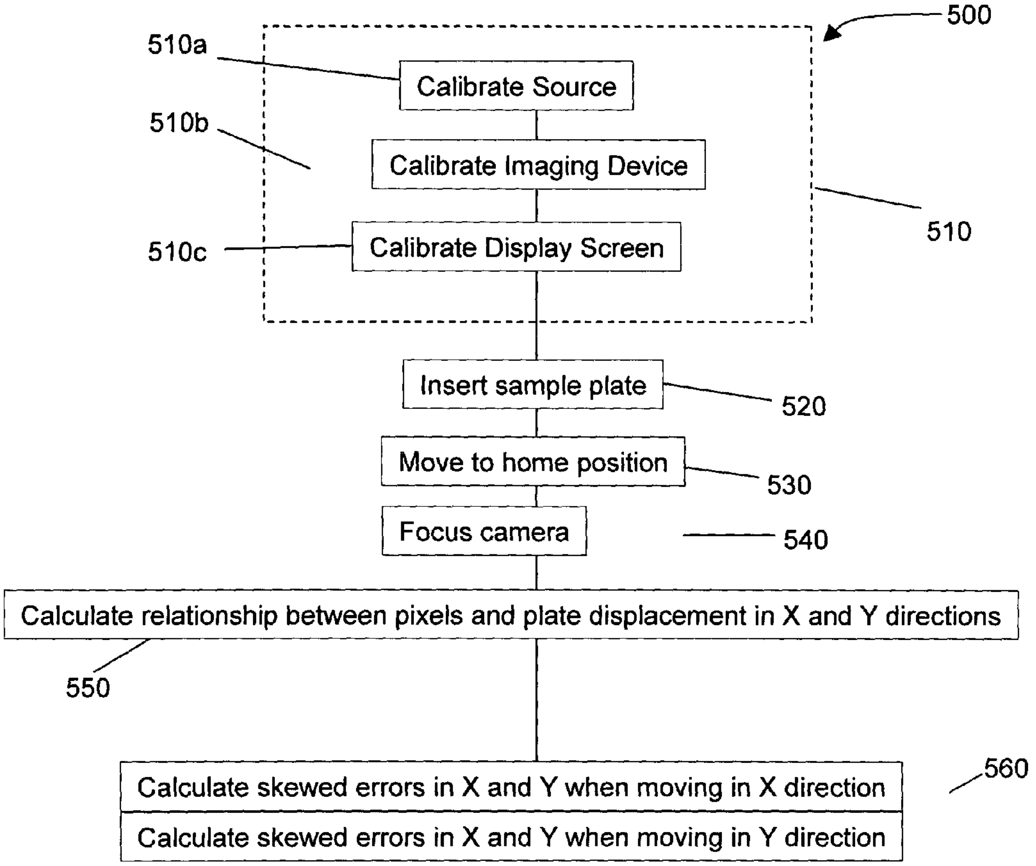
FIG. 5 illustrates a method of calibrating the coordinates of a sample plate according to an aspect of the invention.

FIGS. 5 and 6 illustrate a method 500 of calibrating the position and orientation of a sample plate 140 to account for any deviation between the movement of the controller 145, the movement indicated on the display screen 220, and the actual movement of the sample plate 140. The method provides both a local calibration (i.e., in the target region) and a global calibration (i.e., over the entire plate area).

The method begins with a system calibration (step 510), in which the various components of sample control system 115 (e.g., source 150, imaging device 180 and display screen 220) are aligned with the ion optics of the mass spectrometer in order to define the reference point 210 of the sample control system. The system calibration includes an imaging device calibration, in which the field of view of the imaging device 180 is positioned such that it is aligned with the ion optics and able to detect and capture the image of the sample plate 140 and provide a representation thereof on a display screen 220. The imaging device 180 is focused on a desired location in the plane of the sample plate surface, and is calibrated such that the captured image includes the desired portion of the sample plate surface and has the desired dimensions.

The system calibration also includes a source calibration, which ensures that the laser source 150 is adjusted such that, when activated, it provides a beam with a focal point 165 that is coincident with the reference point 210—that is, a focal point that coincides with the reference point defined for the imaging device as described above. Although not necessarily part of the calibration process, it can be desirable in this process to ensure that the laser is operating at the desired frequency, and with sufficient intensity, diameter, shape, the desired intensity profile, and a focal point 165 to meet requirements.

If necessary, other system components can also be calibrated in step 510. For example, it may be necessary to calibrate the display screen to ensure that it presents the image captured by the imaging device 180 at an optimal desired location and that the cursor 210 is truly representative of the focal point 165 of the source 150 when it is activated.

In one embodiment, the system calibration proceeds as follows. To perform the imaging device calibration, a jig is mounted to the center axis of the ion optics (e.g., a set of quadrupoles), such that a center cross of the jig (marked on a dummy sample plate fixed to the jig) represents the central axis of the quadrupoles. The imaging device is adjusted, focused and secured in place (using, for example, a robotic controller, which can include controller 145, to precisely position the imaging device), such that a reference point of the imaging device (e.g., a cursor or other mark in the viewfinder of display screen of the imaging device is aligned with the center cross of the jig. The imaging device is now calibrated with the ion optics.

To calibrate the laser source, the jig is removed, and a laser-absorbing sample plate is mounted in the sample holder. This sample plate has the same dimensions as a standard sample plate usable in the system, but its surface is coated with a material that absorbs laser energy and produces a visible mark. The laser source is adjusted to provide a laser beam having a desired diameter, and the source is moved (again, using a controller, which can be controller 145, as discussed above) so that the beam's center is aligned with the previously defined reference point of the imaging device. The laser source is secured in this position, which corresponds to the central axis of the ion optics. The laser source is now calibrated as well. Aligning the focal point of the laser (that is, the point where the laser beam hits the surface of the sample plate) and the central axis of the ion optics maximizes the number of ions that are produced by the MALDI process and that subsequently get injected into the mass spectrometer.

When the system calibration is complete, the sample plate 140 is inserted into the sample plate holder 130 (step 520).

The controller 145 is instructed to move the sample plate 140 (or the laser source 150 and/or imaging device 180) such that a first fiducial 610 is aligned with the focal point 165 of the beam 160 from the optical source 150 (step 530). The alignment can be determined automatically (e.g., using pattern recognition techniques) or manually, as described above. This defines a "home" position for the subsequent steps of the calibration.

At this point it may be necessary to focus the camera, or at least ensure that it is able to focus on at least a part of a target region 320 on the sample plate 140, (step 540). Once the focus of the camera is set, is should not be adjusted again until the sample measurement has been taken.

If the coordinate system of the sample plate is not calibrated with the coordinate system of the sample control system, programming the controller 145 to move a predetermined distance from the first fiducial will not result in alignment of the subsequent fiducial 620 with the reference point 210 (e.g., focal point 165). In other words, if one programs the controller 145 to move x units in the x-direction and y units in the y direction, it is expected that the controller 145 will actually move (x,0) and (0,y), assuming no or negligible movement in z is possible. However, if the sample plate 140 is skewed, this may actually translate to a movement to coordinates (x-dx, dy) and (dx, y-dy) on the sample plate 140 itself.

Step 550 accounts for this effect by determining a home position error relative to the pixels on the display screen to determine (dx,dy). This is in effect a local calibration, a calibration based upon the mode in which sample analysis will ultimately occur, with high magnification levels for both the imaging device 180 and the display screen 220. This calculation determines the relationship between the pixels on the display screen 220 and the sample plate 140 displacement in both the x and y directions, as dictated by the controller 145.

There are several ways in which this local calibration can be accomplished. In one embodiment, pattern mapping techniques are used to determine the correct orientation and location of the matrix of target regions 320 on the sample plate 140 within the sample plate holder 130. The pattern mapping can be performed as illustrated in FIG. 6*b*. A first fiducial 610 is aligned with the reference point 210 (i.e., focal point 165 of the beam 160). This is considered a zero point reference (0,0) or the "home" position. Next, the processing unit 190 instructs the controller 145 to move to the predetermined coordinates (x,y) of the second fiducial 620 which is disposed, in this example, near to the first fiducial 610, such that both 610 and 620 are viewable on the display screen at the same time. When the controller 145 has reached its destination, in an ideal situation, the reference point 210 of the beam 160 will be aligned with the fiducial 620. If there is any skew present, the reference point 210 will not align with the fiducial 620, and additional movement—for example, a translation of (dx,dy)—may be required to achieve alignment.

In particular embodiments, when imaging device 180 captures information indicating that the second fiducial 620 and the reference point 210 do not align, the processing unit 190 is then able to determine the amount of the error (dx,dy).

The error (dx, dy) can be determined using pattern recognition techniques, by attempting to match the pattern of the fiducial to be identified with the data points actually measured, and recognizing a pattern in the observed data. The recognition can be based on the size, shape, position, intensity, or other feature identification criteria of the fiducial data. A variety of algorithms can be implemented to provide for noise elimination, rotation and translation-tolerant fiducial matching. Optionally, the calculation can provide weighted solutions, or other such statistical techniques to provide a measure of confidence, in order to help the user decide whether he should calibrate or not, or whether human intervention may be required.

The processing unit 190 can be programmed to match a pattern or patterns detected for fiducial 620 to the data previously detected for fiducial 610.

Alternatively, it can match the pattern of fiducial 620 against one or more predefined fiducials—for example, a database of fiducials that includes data representing one or more possible fiducials (such as fiducials expected to be present on sample plates made by the manufacturer of the particular plate in question). If no match (or only a partial match) is found in the region of the reference point 210, the processing unit 190 can compute the location to which the controller 145 must be moved in order to achieve a substantial match between the captured data and the expected pattern of the fiducial, at a position such that alignment between the reference point 210 and a predetermined position on the second fiducial 620 (for example, the centroid), can be achieved.

Alternatively, the processing unit 190 can compute an error value, which can be used to provide for calibration of the "skewness" of the sample plate 140, or which can be used to compensate for the "skewness" each time the controller 145 is instructed to move the sample plate to a new location.

When evaluating the captured data, the processing unit 190 may compensate for the data received indicative of the perimeter of the target region itself (effectively compensating for "background noise", for example). This can improve the chances of locating the fiducials 410.

Figure 6A:
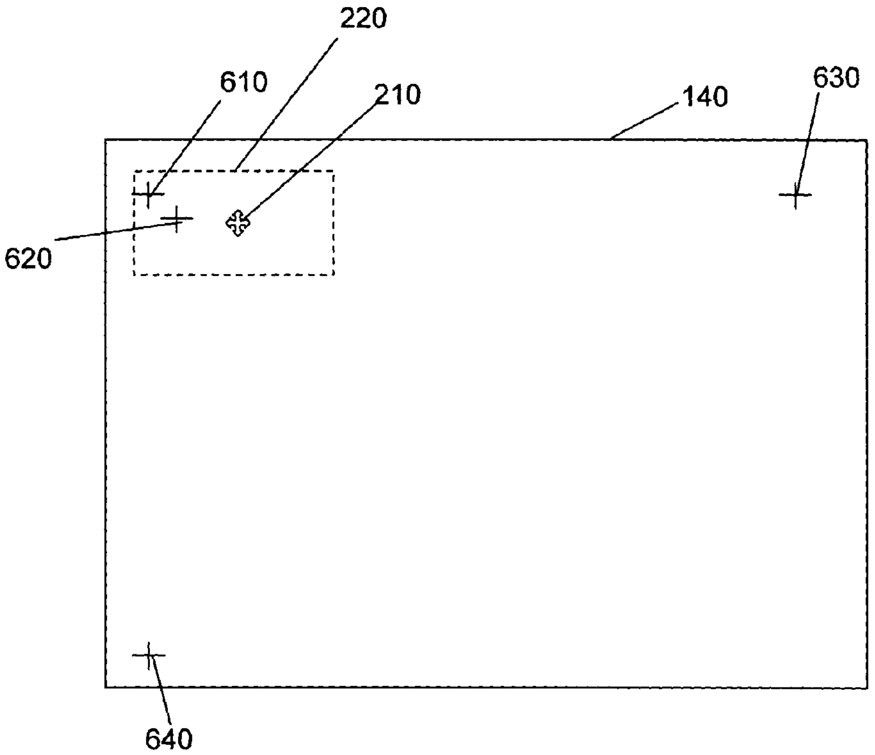
Figure 6B:
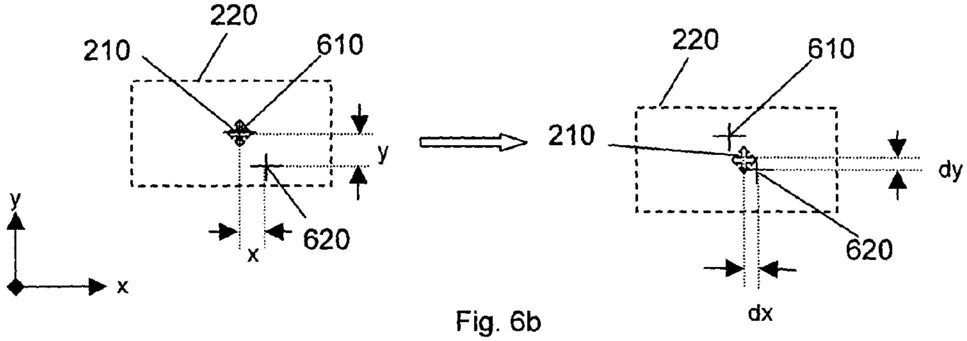
Figure 6C:
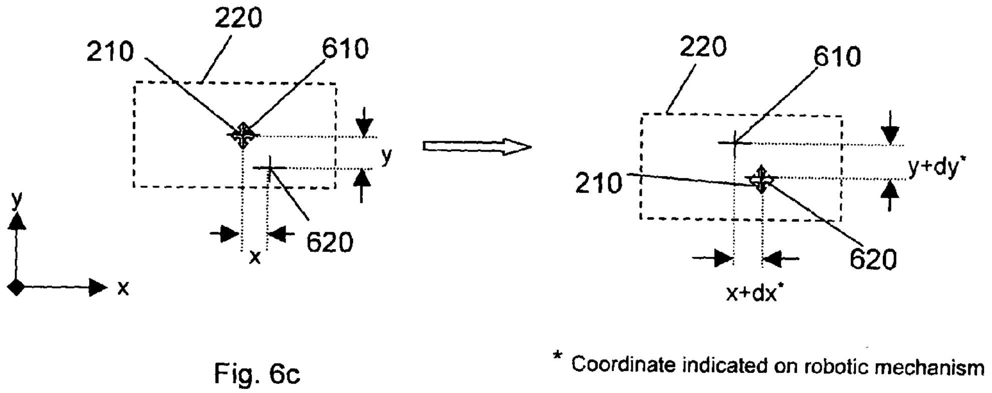

Alternatively, as illustrated in FIG. 6*c*, calibration can be accomplished by moving the sample plate 140 (or laser source 150 and optionally imaging device 180) such that the reference point 210 is aligned to a second fiducial 620 that is in the local vicinity of first fiducial 610. By comparing the known distance between the first and second fiducials with the distance required to actually align the second fiducial 620 and reference point 210, the system can determine the relationship between the pixels viewed on the display screen 220 (that is, the system coordinates) and the sample plate displacement represented by the controller 145 (the sample plate coordinates).

System 100 then instructs controller to return to its home position, (0,0). When the processing unit 190 subsequently instructs the controller 145 to move to the specific coordinates of a target region 320 (e.g., coordinates (5x,5y)), the processing unit 190 uses the dx,dy offsets determined in the calibration to specify a movement to coordinates ((5x+5dx), (5y+5dy)), hence compensating for the skew of the sample plate 140.

Figure 6D:
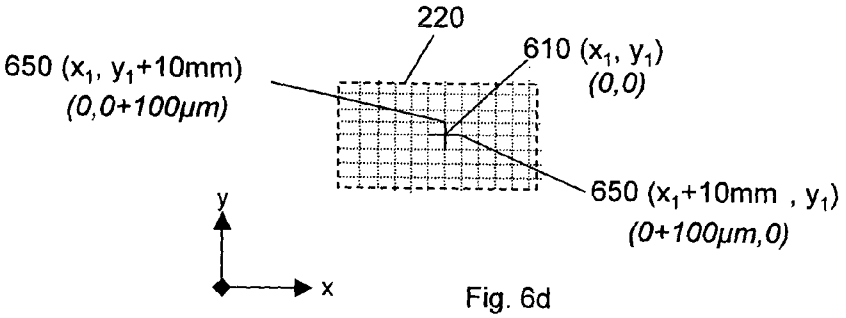

In another alternative, the calibration can be accomplished as illustrated in FIG. 6*d*. In this approach, which does not require actual movement by controller 145 during the calibration, system 100 performs the calibration based on the coordinate system (usually an x-y grid) of the display screen 220 itself. The first fiducial 610 is aligned with the reference point 210, as discussed above to define a zero point reference (0,0) or the "home" position. This point is represented on the display screen 220 at a grid reference of $(x_1,y_1)$. In the example illustrated in FIG. 6*d*, the first fiducial 610 is in the form a cross formed from two intersecting orthogonal lines of known length (i.e., 100 μm). Other shapes of fiducial can be used, provided that the length of at least one dimension is known. On the screen, these segments are found to be displayed with a length of 10 mm. A visual inspection of the displayed representation reveals that a movement to $(x_1+10\text{ mm},y_2)$ is required to get to the location 650, a point 100 μm along the x-direction on the sample plate, and a movement to $(x_1,y_1+10\text{ mm})$ is required to get to the location 660, a point 100 μm along the y-direction. In this manner, no actual movement of the sample plate 410 is required to accomplish this calibration. Here, it is assumed that the controller will attain these destinations to within an acceptable error range.

Having accomplished the local calibration (step 550), system 100 calculates the skew error in both the x and y directions for the entire sample plate 140 (step 560). This calibration is a broad calibration which calculates the relationship between the programmed movement of the controller 145 and the actual movement experienced by the sample plate 140.

In this calibration, the sample plate 140 (or reference point 210) is moved to align the first fiducial 610 with the reference point 210, that is, to the home position, as illustrated in FIG. 6*a* and as described above. The (x,y) coordinate value indicated by the controller is registered as the home position—typically represented as (0,0) or ($h_x$,$h_y$), where $h_x$ and $h_y$ are preassigned x,y coordinates for the home location—which, for the purposes of this example will be assumed to be at the upper left of the sample plate 140.

The controller 145 is then instructed to move in the x direction to a third fiducial 630, which in this example is located in the upper right corner of the sample plate 140. Any error between the actual and expected alignment position of the third fiducial 630 is then used to calculate the sample plate skew in both x and y in the x direction, for example, using the techniques described above in the context of FIGS. 6*a–d*. This process is then repeated in the y direction, making use of a fourth fiducial 620 (located here in the lower left corner of sample plate 140) to calculate the skew that may exist in both the x and y directions, for the sample plate 140, in those directions.

Imaging target regions 320 involves more than simply locating the coordinates of the sample spots available in any one target region 320. In addition to the local and global calibrations discussed above, the techniques described herein can be used to provide for: the provision of adequate illumination over the entire sample spot, the storing of the associated geometric and density correction factors, the stretching of the sample image to give a "round" sample, the calibration of images to standards within the sample spot or on an adjacent sample spot (but on the same sample plate), in addition to the location and quantification of the intensity data related to each sample spot and portions thereof.

Once the system has been calibrated, sample analysis can commence. The system and methods described above make it possible to utilize the imaging device 180 attached to a conventional MALDI system to accurately locate the sample plate 140 with respect to the focal point 165 of the optical source, thereby facilitating automation. However there are other useful applications that can be made of the imaging device 180, which may further enhance the automation of such a system. These aspects are discussed below.

Figure 7A:

With accurate calibration, the imaging device 180 can be positioned such that substantially one entire target region 320 fills the viewfinder of the imaging device 180, and/or the display screen 220, as illustrated in FIG. 7*a*.

Referring to FIG. 7*a*, it will be apparent that the spot that is displayed to the user via the view finder or a display screen is oval, and not circular, in shape, since the imaging device 180 is positioned at an angle β, as discussed above.

Figure 7B:
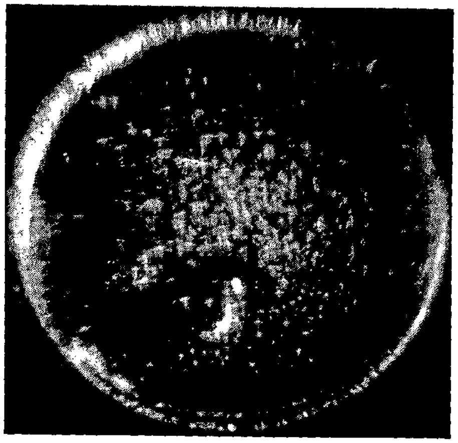

In one aspect of image processing, processing unit 190 can be configured to "stretch" the sample spot image to create a substantially circular image, as illustrated in FIG. 7*b*. This can make it easier for system 100, or a user of the system in a semi-automated mode, to locate sample spot regions that include a high concentration of sample crystals (which should produce a high intensity of sample ions upon irradiation by source 150).

Pattern recognition can also be utilized to find the "sweet spot" (the theoretical optimum location for producing mass spectrometry results, or the points of highest analyte concentration) in the shortest time by analyzing the image acquired from a digital imaging means 180 mounted on the ion source 110. The image from the imaging device 180 is processed to identify the areas of highest crystal concentration. The coordinates in the displayed image corresponding to the target region(s) containing the highest concentrations of crystals are then converted into the coordinates where the corresponding concentrations can be located on the actual sample plate 140 via the controller 145. The controller 145 then moves the sample plate 140 to align the focal point 165 with the appropriate coordinate position. The source 150 then irradiates at the identified coordinate position, and optionally several locations around that position. As discussed previously, the processing unit 190 may be able to use supplemental fiducials, such as the perimeter of the target region itself, to assist in selecting a "sweet spot" region to subject to source activation.

If more than one area of high sample concentration exists, the system can be configured to identify the shortest path between these intensity areas. The coordinates can be provided to the controller 145, which moves to the appropriate position prior to activation of the source 150. In this manner, an intelligent search pattern can be used to cut down the cycle time, enhance the signal to noise ratio and increase "shot-to-shot" (laser) reproducibility. The mass spectrometer 170 will provide useful data, in an automated fashion.

The user can visually ascertain the areas of greatest sample concentration, and select these areas via the user interface (e.g., with a pointing device, such as a mouse). The coordinates of the selected location can then be determined by the processing software, and stored in memory. These coordinates can then be used to instruct the controller 145 to move to the appropriate position prior to activation of the source 150, that is, to move the sample plate 140 (or focal point 165) so that the selected sample spot is at the focal point 165 of the beam 160. This is a partially automated technique, as it requires some user involvement after the sample plate 140 has been placed in the sample plate holder 130.

When analysis on one sample plate 140 has been completed, the processing unit 190 can be configured to activate a second controller to physically remove the sample plate 140 from the sample plate holder 130. This same second controller can be configured to insert a second sample plate into the sample plate holder 130 so that analysis of a second plate can commence. This addition provides for full automation of the analysis system.

In one embodiment, the ion source 110 includes a MALDI apparatus. The MALDI apparatus generally includes a sample receiving section, having a slot into which a removable sample or well plate 140 can be inserted (either directly or via a sample plate holder 130). The loading of the sample plate 140 into the holder 130 may be carried out manually or using a controller 145 using conventional techniques.

In another embodiment, the ion source is a high pressure liquid chromatograph (HPLC). The eluent from the HPLC is continuously deposited onto the sample plate as a long track or in substantially discrete spots. The width of the sample track has a strong dependence on the organic contents and the flow rate of the eluent of the HPLC. Thus the pattern of the track, the spot size and/or shape, will change from LC peak to LC peak and over the elution time, and from sample to sample, causing the areas in which analyte can be found to vary. The pattern recognition software can locate the track as well as areas of crystal formation along the track. The software then guides the laser to hit the crystals in the most effective way, to generate the optimum signal to noise ratio, within the predetermined chromatographic retention time window.

The pulsed nature of laser desorption matches that of Time of Flight mass spectrometers. However, the tuning and calibration procedures for trapping conditions and high sensitivity measurement in FTICR and quadrupole ion traps are hindered by the low shot to shot reproducibility. The techniques described herein can be used in tuning and calibration procedures to improve signal reproducibility. The techniques described herein can also be utilized to find and optimize the sample track from a continuous sample deposition from a reverse-phase HPLC. The techniques can also be utilized with sources 150 that are continuous in nature, and with some pulsed sources, if pulsed at a sufficiently high frequency to act essentially as continuous sources, providing for what is known as a beam instrument.

As illustrated in FIG. 3, the sample plate holder 130 includes a recess for receiving the sample plate 140. The recess snuggly receives the sample plate 140, thereby retaining the sample plate in a substantially stationary position. As discussed above, the plate 140 may contain precisely located apertures 330 to accurately determine the location of the entire plate 140 within the holder 130. However, location of the sample plate 140 within the sample plate holder 130 may not necessarily provide for a predetermined disposition of the target areas.

The laser source 150 is directed at the sample and, when activated, provides energy to desorb both the matrix and analyte and to obtain efficient ionization in a gas phase as proton transfer occurs, without decomposing the analyte molecules. The matrix plays a key role in this technique by absorbing the laser light energy and causing part of the illuminated sample to vaporize. The matrix molecules absorb most of the incident laser energy, minimizing sample damage and fragmentation. Nitrogen lasers operating at 337 nm (a wavelength that is well absorbed by most UV matrices) are the most common illumination sources because they are inexpensive and offer the ideal combination of power/wavelength/pulse width. However, any laser, from other UV to even IR pulsed lasers, can be used in appropriate circumstances—for example, with properly selected matrices. The host matrix is selected to absorb the radiation, and therefore the wavelength of the radiation is selected according to the absorbance characteristics of the matrix material. Once the sample molecules are vaporized and ionized, they transfer electrostatically into a mass spectrometer, for example a time-of-flight mass spectrometer (TOF-MS) where they are separated from the matrix ions, and individually detected, based on their mass-to-charge (m/z) ratios and analyzed. In a TOF mass spectrometer, the mass of the ionized analyte molecule can then be determined by the arrival time of the individual analyte ion at the detector, a function of mass/charge ratio.

The imaging device 180 is typically provided for viewing a sample under controlled illumination conditions when the sample is positioned for analysis. In particular embodiments, the imaging device 180 can include a cooled charge-coupled device (CCD) camera. A CCD is a light sensitive integrated circuit that stores and displays the data for an image in such a way that each pixel (picture element) in the image is converted into an electrical charge the intensity of which is related to a color in the color spectrum. A detector digitizes the picture on a per-pixel basis, and provides a resulting data structure, typically referred to as an image. Depending on the application, the imaging device may provide a binary image (i.e., a single bit per pixel) or a gray scale or color image (i.e., a plurality of bits per pixel). Color or gray scale digital imagery can be used to distinguish between different types of materials (e.g., different crystal types, different tissue types, etc.) and to determine which material types produce the best data. The image contains the raw content of the sample plate, to the precision of the resolution of the imaging device. The image may be sent to a memory device, displayed, or stored as a file in a storage media, which may be a disk or other storage device.

In one embodiment, the imaging device can be coupled to an optical image intensifier for use in conditions of extremely low light levels. Incident illumination from the specimen can be amplified by the intensifier, and the amplified light can be accumulated in the camera over a period of time. At the end of that time, the camera is read out to a dedicated controller or imaging apparatus that reproduces the light image. Factors which influence the ability of CCD arrays to detect small numbers of incoming photons include quantum efficiency, readout noise, dark noise, and the small size of most imaging arrays. Other imaging devices can also be used.

The controller 145 typically includes a robot or programmable controller connected to motors, such as stepper motors. The controller can include a microprocessor and an operating system capable of controlling the motion of the sample plate (or the laser source and imaging device) in accordance with programmed instructions saved in memory of the controller and/or communicated to the controller from a remote source. The imaging device 180 can be programmed to convey the physical position of a first fiducial 310 to the processing unit 190. Since the physical position of the focal point 165 of the optical source 150 (i.e., the reference point 210) is known, the processing unit 190 can then compute how much, and in which direction, movement is required to align the physical measured position of the first fiducial 310 with the previously ascertained position of the focal point 165. The controller, using position feedback signals from the processing unit 190 is able to position the sample plate and focal point 165 accurately. Movement of the controller 145 along the Y-axis allows a first group of target regions to be sequentially aligned with the focal point 165 of the optical source 150. Subsequent movement of the controller 145 along the X-axis allows a second group of target areas to be sequentially aligned with the focal point 165 of the laser source 150, and so on.

Control electronics and software can be provided for permitting feedback control of the sample plate holder 130 via the controller 145 and the mass spectrometer 170, as well as any associated external instruments, based on analysis by the processing means 190, of sample images, mass spectra, or other available data generated by the processing means 190 or by the external instrumentation. Optionally, the x and y coordinates of the fiducials can be treated statistically to produce a single x, y point which is stored as a calibration point.

The methods of the invention can be implemented in digital electronic circuitry, or in computer hardware, firmware, software, or in combinations of them. The methods of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order, and/or combined, and still achieve desirable results. In particular, the various calibration steps can be performed in different orders, and individual calibration steps can be performed without performing the entire calibration sequence (for example, when a new sample plate is inserted, or when a particular component is out of alignment). While the techniques have been described in the context of irradiating a sample plate with a laser for the purposes of MALDI mass spectrometry, they can be used in other contexts requiring the precise alignment of substrates, energy or light sources, and detection apparatus.

What is claimed is:

1. A method of calibrating an ion source, the ion source including a sample control system including a sample holder for supporting a sample plate in a sample plane and a laser source having a focal point representing a point at which a beam generated by the laser source intersects the sample plane, the method comprising:

mounting a sample plate in the sample holder, the sample plate including one or more fiducials defining reference points of a sample plate coordinate system and one or more target regions at one or more predefined locations in the sample plate coordinate system;

determining a relationship between the coordinate system of the sample plate and a coordinate system of the sample control system, the relationship being determined at least in part by aligning one or more fiducials relative to a reference point of the sample control system using computer-implemented pattern recognition techniques; and using the determined relationship to align one of the target regions of the sample plate with ion optics of a mass spectrometer for a mass spectrometric analysis.

2. The method of claim 1, wherein at least one of the fiducials is positioned at a known displacement from a target location of at least one of the target regions.

3. The method of claim 2, wherein at least one of the one or more fiducials is formed on a surface of the sample plate.

4. The method of claim 2, wherein:

at least one of the one or more fiducials is formed on a surface of the sample holder.

5. The method of claim 2; wherein:

the target location of at least one of the target regions is a centroid of the at least one of the target regions.

6. The method of claim 2, wherein:

the at least one of the fiducials forms the target location of the at least one of the target regions.

7. The method of claim 1, wherein the one or more fiducials include a first fiducial and a second fiducial disposed at a known displacement from the first fiducial, and determining a relationship between a coordinate system of the sample plate and a coordinate system of the sample control system includes:

aligning the reference point with a first fiducial of the one or more fiducials;

moving the sample plate relative to the sample control system or the focal point by a distance and in a direction corresponding to the known displacement; and determining an alignment error of the coordinate systems of the sample control system and the sample plate based at least in part on the aligning and the moving.

8. The method of claim 1, wherein determining a relationship between a coordinate system of the sample plate and a coordinate system of the sample control system includes:

generating a first image of the sample plate, the first image including a representation of at least a first fiducial of the one or more fiducials;

processing the first image to identify a location of the first fiducial in the first image;

aligning the reference point of the sample control system relative to the identified location of the first fiducial; and determining an alignment error of the coordinate systems of the sample control system and the sample plate based at least in part on the alignment of the reference point relative to the identified location of the first fiducial.

9. The method of claim 8, wherein determining a relationship between a coordinate system of the sample plate and a coordinate system of the sample control system includes:

processing the first image to identify a location of a second fiducial in the first image;

aligning the reference point of the sample control system relative to the identified location of the second fiducial; and determining an alignment error of the coordinate systems of the sample control system and the sample plate based at least in part on the alignment of the reference point relative to the identified location of the second fiducial.

10. A method of calibrating an ion source, the ion source including a sample control system including a sample holder for supporting a sample plate in a sample plane and a laser source having a focal point representing a point at which a beam generated by the laser source intersects the sample plane, the method comprising:

mounting a sample plate in the sample holder, the sample plate including one or more target regions;

determining a relationship between a coordinate system of the sample plate and a coordinate system of the sample control system, the relationship being determined at least in part by aligning one or more fiducials relative to a reference point of the sample control system, the fiducials including a first fiducial, a second fiducial disposed at a known displacement from the first fiducial, and a third fiducial, and by defining reference points of the sample plate coordinate system, the determining including:

generating a first image of the sample plate, the first image including a representation of at least a first fiducial and a second fiducial of the one or more fiducials;

processing the first image to identify a location of the first fiducial and a location of the second fiducial in the first image;

aligning the reference point of the sample control system relative to the identified location of the first fiducial and the location of the second fiducial;

moving the sample plate relative to the reference point;

generating a second image of the sample plate, the second image including a representation of a third fiducial of the one or more fiducials;

processing the second image to identify a location of a third fiducial in the second image;

aligning the reference point of the sample control system relative to the identified location of the third fiducial; and determining an alignment error of the coordinate systems of the sample control system and the sample plate based at least in part on the moving and alignment of the reference point relative to the identified locations of the first, second, and third fiducials; and using the determined relationship to align a target region of the sample plate with ion optics of a mass spectrometer for a mass spectrometric analysis.

11. The method of any of claims 1, 7, 8, 9 and 10, wherein:

the processing, aligning, or determining an alignment error are performed automatically in a sample control application.

12. The method of claim 1, further comprising:

calibrating the focal point of the laser source and the coordinate system of the sample control system.

13. The method of claim 12, wherein:

calibrating the focal point of the laser source and the coordinate system of the sample control system includes aligning the focal point of the laser source and the reference point of the sample control system with the ion optics.

14. The method of claim 13, wherein aligning the focal point of the laser source and the reference point of the sample control system with the ion optics includes:

identifying a point in the sample plane corresponding to a center axis of the ion optics; and aligning the focal point of the laser source and the reference point of the sample control system with the identified point.

15. The method of claim 12, wherein aligning the focal point of the laser source and the reference point of the sample control system with the ion optics includes:

aligning the reference point of the sample control system with a central axis of the ion optics; and aligning the focal point with the reference point of the sample control system.

16. The method of claim 1, wherein determining a relationship includes:

determining one or more offsets that relate the coordinate system of the sample plate and the coordinate system of the sample control system.

17. The method of claim 16, wherein using the determined relationship includes:

using the offsets to control a movement of the sample plate relative to the focal point or a firing of the laser source, with an accuracy of less than about +/−100 μm.

18. The method of claim 1, wherein:

one or more of the fiducials includes two lines arranged in substantially orthogonal configuration.

19. A computer program product, tangibly embodied on a computer-readable medium, for calibrating an ion source, the ion source including a sample control system including a sample holder for supporting a sample plate in a sample plane, and a laser source having a focal point representing a point at which a beam generated by the laser source intersects the sample plane, the product including instructions operable to cause data processing apparatus to perform operations comprising:

receiving data indicating that a sample plate is mounted in the sample holder, the sample plate including one or more fiducials defining reference points of a sample plate coordinate system and one or more target regions at one or more predefined locations in the sample plate coordinate system;

determining a relationship between the coordinate system of the sample plate and a coordinate system of the sample control system, the relationship being determined at least in part by aligning one or more fiducials relative to a reference point of the sample control system using pattern recognition techniques; and using the determined relationship to align one of the target regions of the sample plate with ion optics of a mass spectrometer for a mass spectrometric analysis.

20. The computer program product of claim 19, wherein at least one of the fiducials is positioned at a known displacement from a target location of at least one of the target regions.

21. The computer program product of claim 20, wherein at least one of the one or more fiducials is formed on a surface of the sample plate.

22. The computer program product of claim 20, wherein:

at least one of the one or more fiducials is formed on a surface of the sample holder.

23. The computer program product of claim 20, wherein:

the target location of at least one of the target regions is a centroid of the at least one of the target regions.

24. The computer program product of claim 20, wherein:
the at least one of the fiducials forms the target location of the at least one of the target regions.

25. The method of claim 19, wherein the one or more fiducials include a first fiducial and a second fiducial disposed at a known displacement from the first fiducial, and determining a relationship between a coordinate system of the sample plate and a coordinate system of the sample control system includes:
aligning the reference point with a first fiducial of the one or more fiducials;
moving the sample plate relative to the sample control system or the focal point by a distance and in a direction corresponding to the known displacement; and
determining an alignment error of the coordinate systems of the sample control system and the sample plate based at least in part on the aligning and the moving.

26. The computer program product of claim 19, wherein determining a relationship between a coordinate system of the sample plate and a coordinate system of the sample control system includes:
generating a first image of the sample plate, the first image including a representation of at least a first fiducial of the one or more fiducials;
processing the first image to identify a location of the first fiducial in the first image;
aligning the reference point of the sample control system relative to the identified location of the first fiducial; and
determining an alignment error of the coordinate systems of the sample control system and the sample plate based at least in part on the alignment of the reference point relative to the identified location of the first fiducial.

27. The computer program product of claim 26, wherein determining a relationship between a coordinate system of the sample plate and a coordinate system of the sample control system includes:
processing the first image to identify a location of a second fiducial in the first image;
aligning the reference point of the sample control system relative to the identified location of the second fiducial; and
determining an alignment error of the coordinate systems of the sample control system and the sample plate based at least in part on the alignment of the reference point relative to the identified location of the second fiducial.

28. A computer program product, tangibly embodied on a computer-readable medium, for calibrating an ion source, the ion source including a sample control system including a sample holder for supporting a sample plate in a sample plane and a laser source having a focal point representing a point at which a beam generated by the laser source intersects the sample plane, the product including instructions operable to cause data processing apparatus to perform operations comprising:
receiving data indicating that a sample plate is mounted in the sample holder, the sample plate including one or more target regions;
determining a relationship between a coordinate system of the sample plate and a coordinate system of the sample control system, the relationship being determined at least in part by aligning one or more fiducials relative to a reference point of the sample control system, the fiducials including a first fiducial, a second fiducial disposed at a known displacement from the first fiducial, and a third fiducial, and by defining reference points of the sample plate coordinate system, the determining including:
generating a first image of the sample plate, the first image including a representation of at least a first fiducial and a second fiducial of the one or more fiducials;
processing the first image to identify a location of the first fiducial and a location of the second fiducial in the first image;
aligning the reference point of the sample control system relative to the identified location of the first fiducial and the identified location of the second fiducial;
moving the sample plate relative to the reference point;
generating a second image of the sample plate, the second image including a representation of a third fiducial of the one or more fiducials;
processing the second image to identify a location of a third fiducial in the second image;
aligning the reference point of the sample control system relative to the identified location of the third fiducial; and
determining an alignment error of the coordinate systems of the sample control system and the sample plate based at least in part on the moving and alignment of the reference point relative to the identified locations of the first, second, and third fiducials; and
using the determined relationship to align a target region of the sample plate with ion optics of a mass spectrometer for a mass spectrometric analysis.

29. The computer program product of any of claims 19, 25, 26, 27 and 28, wherein:
the processing, aligning, or determining an alignment error are performed automatically in a sample control application.

30. The computer program product of claim 19, further comprising:
calibrating the focal point of the laser source and the coordinate system of the sample control system.

31. The computer program product of claim 30, wherein:
calibrating the focal point of the laser source and the coordinate system of the sample control system includes aligning the focal point of the laser source and the reference point of the sample control system with the ion optics.

32. The computer program product of claim 31, wherein aligning the focal point of the laser source and the reference point of the sample control system with the ion optics includes:
identifying a point in the sample plane corresponding to a center axis of the ion optics; and
aligning the focal point of the laser source and the reference point of the sample control system with the identified point.

33. The computer program product of claim 30, wherein aligning the focal point of the laser source and the reference point of the sample control system with the ion optics includes:
aligning the reference point of the sample control system with a central axis of the ion optics; and
aligning the focal point with the reference point of the sample control system.

34. The computer program product of claim 19, wherein determining a relationship includes:
determining one or more offsets that relate the coordinate system of the sample plate and the coordinate system of the sample control system.

35. The computer program product of claim 34, wherein using the determined relationship includes:

using the offsets to control a movement of the sample plate relative to the focal point or a firing of the laser source, with an accuracy of less than about +/−100 μm.

36. The computer program product of claim 19, wherein:

one or more of the fiducials includes two lines arranged in substantially orthogonal configuration.

37. A mass spectrometry system, comprising:

an ion source, the ion source including a sample control system including a sample holder for supporting a sample plate in a sample plane and a laser source having a focal point representing a point at which a beam generated by the laser source intersects the sample plane; and a processing unit configured to perform operations comprising:

determining a relationship between a coordinate system of a sample plate mounted in the sample holder and a coordinate system of the sample control system, the relationship being determined at least in part by aligning one or more fiducials relative to a reference point of the sample control system using computer-implemented pattern recognition techniques, the fiducials defining reference points of the sample plate coordinate system; and using the determined relationship to align a target region of the sample plate with ion optics of a mass spectrometer for a mass spectrometric analysis, the target region at a predefined location in the sample plate coordinate system.

38. The method of claim 1, wherein:

at least one of the fiducials is positioned at a determinable displacement from the target location of at least one of the target regions.

39. The method of claim 38, wherein:

at least one of the target regions provides at least one of the fiducials.

40. The method of claim 39, wherein:

a perimeter of at least one of the target regions provides at least one of the fiducials.

41. The method of claim 1, wherein:

at least one of the one or more target regions comprises a track of eluent.

42. A method of generating ions for mass spectrometry, comprising:

depositing a sample onto a sample plate to provide one or more target regions in the sample, the sample plate including one or more fiducials defining reference points of a sample plate coordinate system, the one or more target regions at one or more defined locations in the sample plate coordinate system;

mounting the sample plate in a sample holder of an ion source having a sample control system;

determining a relationship between the coordinate system of the sample plate and a coordinate system of the sample control system, the relationship being determined at least in part by aligning the one or more fiducials relative to a reference point of the sample control system using computer-implemented pattern recognition techniques;

using the determined relationship to align one of the target regions of the sample plate with ion optics of a mass spectrometer;

directing a beam from a laser source to the target location in the sample by directing the beam at a known or determinable displacement from at least one of the fiducials.

43. The method of claim 42, wherein:

the ion source comprises a matrix assisted laser desorption ionization (MALDI) source.

44. The method of claim 42, wherein:

depositing the sample includes depositing eluent from a high pressure liquid chromatograph (HPLC).

45. The method of claim 44, wherein:

depositing the sample includes depositing the eluent in a track.

46. The method of claim 1, wherein:

the sample plate includes a representation of sample data or plate data.

47. The method of claim 46, wherein:

the plate data includes information identifying the layout of the one or more target regions on the sample plate.

48. The method of claim 1, wherein:

determining a relationship using computer-implemented pattern recognition techniques includes matching a pattern in observed data representing one of the one or more fiducials with a predefined fiducial.

49. The computer program product of claim 19, wherein:

the sample plate includes a representation of sample data or plate data.

50. The computer program product of claim 49, wherein:

the plate data includes information identifying the layout of the one or more target regions on the sample plate.

51. The computer program product of claim 19, wherein:

determining a relationship using computer-implemented pattern recognition techniques includes matching a pattern in observed data representing one of the one or more fiducials with a predefined fiducial.

* * * * *